(12) United States Patent
Wu

(10) Patent No.: US 11,304,320 B2
(45) Date of Patent: Apr. 12, 2022

(54) PROVIDING ACCESS TO A SWITCH OF ELECTRONIC DEVICES

(71) Applicant: HEWLETT-PACKARD DEVELOPMENT COMPANY, L.P., Houston, TX (US)

(72) Inventor: Wei-Ming Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 494 days.

(21) Appl. No.: 16/325,288

(22) PCT Filed: Oct. 20, 2016

(86) PCT No.: PCT/US2016/057872
§ 371 (c)(1),
(2) Date: Feb. 13, 2019

(87) PCT Pub. No.: WO2018/075044
PCT Pub. Date: Apr. 26, 2018

(65) Prior Publication Data
US 2021/0400826 A1 Dec. 23, 2021

(51) Int. Cl.
*H05K 5/02* (2006.01)
*H05K 7/14* (2006.01)

(52) U.S. Cl.
CPC ............ *H05K 5/0217* (2013.01); *H05K 7/14* (2013.01)

(58) Field of Classification Search
None
See application file for complete search history.

(56) References Cited

U.S. PATENT DOCUMENTS

| | | | |
|---|---|---|---|
| 5,803,237 A | 9/1998 | Gandre et al. | |
| 6,331,934 B1 * | 12/2001 | Helot ................... | G06F 1/1632 361/679.41 |
| 6,570,758 B1 * | 5/2003 | Maeda ................ | E05B 73/0082 248/552 |
| 7,408,126 B2 | 8/2008 | Liu et al. | |
| 8,054,614 B2 | 11/2011 | Albertini et al. | |
| 9,152,826 B2 * | 10/2015 | Zhang .................... | G06F 21/88 |
| 9,448,586 B2 * | 9/2016 | Lo .......................... | G06F 1/1656 |
| 2011/0013372 A1 * | 1/2011 | Kang .................. | H01R 13/447 361/752 |
| 2014/0041425 A1 | 2/2014 | Pinzon | |
| 2014/0246297 A1 | 9/2014 | Zhang | |
| 2015/0156301 A1 | 6/2015 | Crawford et al. | |
| 2015/0305182 A1 | 10/2015 | Berry et al. | |
| 2016/0140816 A1 | 5/2016 | Gulick et al. | |

FOREIGN PATENT DOCUMENTS

CN 203433516 U 2/2014

* cited by examiner

*Primary Examiner* — James Wu
*Assistant Examiner* — Christopher L Augustin
(74) *Attorney, Agent, or Firm* — HPI Patent Department

(57) ABSTRACT

Examples of providing access to a switch of an electronic device are described herein. In an example, a housing of the electronic device includes a sidewall having an opening to receive an external actuator to access a switch of the electronic device. The housing further includes a first bracket and a second bracket, both movably coupled to the sidewall. The first bracket includes an actuator opening, which when aligned with the opening of the sidewall, allows the external actuator to access the switch. Further, the second bracket is moveable to co-operate with the first bracket to align the actuator opening with the opening to provide access to the switch.

14 Claims, 4 Drawing Sheets

PROVIDING ACCESS TO A SWITCH OF ELECTRONIC DEVICES

BACKGROUND

Electronic devices, such as desktop computers, notebook computers, or laptops are often used in public places. While portable electronic devices may belong to individuals, devices like personal computer may be installed for public use. Most of the electronic devices include one or more externally actuated switches, such as reset switches. Generally, an open access is provided to the switches, which may be operated by a suitable actuator.

BRIEF DESORPTION OF FIGURES

The following detailed description references the drawings, wherein.

DETAILED DESCRIPTION

Figure 1:
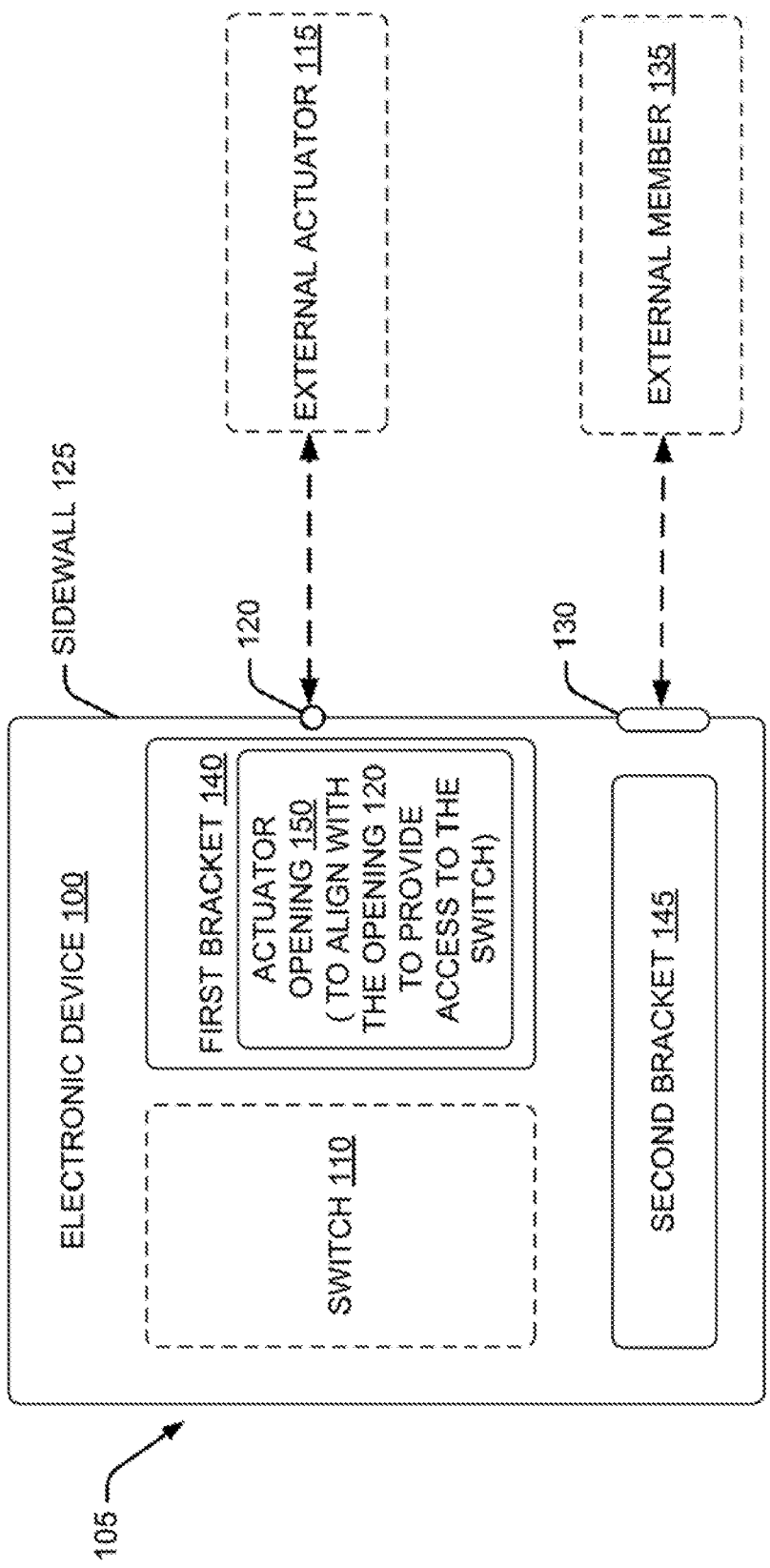
FIG. 1 illustrates an example block diagram representation of a housing of an electronic device, according to an example implementation of the present subject matter.

Electronic devices perform a variety of functions; while some of these may be activated by a software trigger, few others may be activated through a physical switch, which may be physically activated by an external actuator. To ensure data security and data integrity, venous techniques are implemented to restrict access to functions triggered through software. However, the functions activated through the external actuator may still be accessible, thus making the electronic device prone to unauthorized access by any individual who may possess such an actuator.

The unrestricted access may be of concern especially in cases where the electronic device is used in public places and is left unattended for specific periods of time. In such scenarios, an anti-theft device, such as a Kensington lock is generally used to prevent theft of the electronic device or its components, such as a battery. Kensington locks generally secure the electronic device to an object, such as a leg of a chair or a table, or a pole, thereby restricting the movement of the electronic device. While the electronic device is in a locked condition, i.e., when the anti-theft device coupled to the electronic device is operational, certain functions, such as a device reset function, may still be accessible through externally activated switches. Consequently, a locked device may not be stolen but its settings or data may be changed, due to open access to these functions. For instance, an unauthorized person may access the device reset switch to reset the electronic device to factory settings resulting in data loss and software damage, thus compromising data and device security.

Moreover, the electronic devices may be susceptible to damage even in private use, when they are not in a locked condition. For instance, a switch may be accidentally operated by any individual, for example, a child. This may damage or delete the data stored on the electronic device and/or a component of the electronic device. Thus, open access to the externally actuated switch may make the electronic device and the data contained therein prone to damage.

Approaches to provide access to externally activated switches in an electronic device are described. In an example, a housing of the electronic device may include a first bracket and a second bracket, both moveably coupled to a sidewall of the housing. In one example, the first bracket is coupled so that it pivotally moves in the same plane in which the sidewall is present. The second bracket in turn is so coupled such that it pivotally moves with respect to the sidewall in a plane which extends perpendicular to the surface of the sidewall. The sidewall of the housing may include an opening to receive an external actuator to access and actuate a switch of the electronic device. The sidewall of the housing may further include a slot to receive an external member. Example of such an external member includes, but is not limited to, a Kensington lock. The first bracket is positioned in a way such that it is present in between the sidewall opening and the switch.

Each of the free ends of the first bracket and the second bracket further engage with each other. In one example, the second bracket when engaged maintains the first bracket in a position such that the opening in the sidewall and the opening of the first bracket are aligned. In this position, it may be considered that notional longitudinal axes passing through each of the first bracket and the second bracket along their length, may be parallel to each other.

The first bracket may include an actuator opening to receive the external actuator. The external actuator, for actuating the switch, may pass through the opening in the sidewall and the actuator opening. For this, i.e., for actuating the switch, both the openings of the sidewalls and the first bracket are to be aligned. The openings may be considered as aligned when their respective perpendicular axes overlap. As mentioned previously, the first bracket may move with respect to the sidewall. As would be understood, any movement of the first bracket would disturb the alignment of the openings on the sidewall and the first bracket. Thus, any change in the alignment of the opening would prevent the external actuator to access and actuate the switch.

In an example, an external member may be inserted into the slot in the sidewall. When the slot is not occupied, the two openings may be aligned to allow access to the switch, in the unoccupied condition, the slot is unoccupied, and the second bracket engages with the first bracket to align the actuator opening in the first bracket with the opening in the sidewall. On the other hand, in the occupied condition, i.e., when the external member occupies the slot, the external member pushes the second bracket to cause the second bracket to disengage from the first bracket. As a result, the first bracket is caused to move in the same plane as that of the sidewall, thereby changing the alignment of the actuator opening with the opening in the sidewall. Consequently, a portion of the first bracket blocks the opening in the sidewall and the switch is rendered inaccessible and inoperable.

In this manner, while an anti-theft lock, such as the Kensington lock may prevent the electronic device from being stolen, the present subject matter prevents the electronic device from damage that may be caused due to unauthorized access to externally operable switches even when the device is secured with the anti-theft lock. The access may be restricted themes as well by deploying a suitable external member. Further, the present subject matter provides for enhanced security without increasing complexity or adding substantial costs. Also, the mechanism implementing the present subject matter is compact and may be easily implemented in any electronic device without adding on to weight of the electronic device.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a block diagram of an example electronic device 100, according to an example implementation of the present subject matter. In the present figure, the components illustrated in broken lines indicate features for which no protection is being sought. The electronic device 100 may be instance, a laptop or a processor of a desktop computer. The electronic device 100 may include a housing 105 for holding various components, such as one or more switch(es) 110. The switch 110 may include depressible type switch or push-button switch, which may be actuated by an external actuator 115, such as a key or a pin. The switch 110 may be made accessible through an opening 120 in a sidewall 125 of the housing 105. The side all 125 may include a slot 130 to receive an external member 135. The shape and configuration of the external actuator 115 corresponds to the shape and configuration of the opening 120 to access the switch 110. For instance, the opening 120 may be substantially circular with multiple depressions, and accordingly the external actuator 115 may also have substantially circular shape with protrusions to fit in the depressions of the opening 120.

In an example, the housing 105 may also include a first bracket 140 and a second bracket 145. Each of the first bracket 140 and the second bracket 145 may be movably coupled to the sidewall 125 to engage and disengage from each other. The first bracket 140 may include an actuator opening 150 to receive the external actuator 115 and to align with the opening 120.

According to aspect of the present subject matter, the external actuator 115 is to now to pass through the actuator opening 150, in addition the opening 120 in the sidewall 125, to access the switch 110. In operation, the first bracket 140 and, the second bracket 145 are to engage in an unoccupied condition of the electronic device 100 to align the two openings, i.e., the opening 120 in the sidewall 125 and the actuator opening 150, thereby making the switch 110 accessible to the external actuator 115.

However, in an occupied condition, where the external member 135 may be received in the slot 130 of the sidewall 125, the two brackets 140 and 145 may disengage such that the first bracket 140 blocks the opening 120 of the sidewall 125. Accordingly, in the occupied condition, for instance, when the electronic device 100 is locked, the alignment of the openings in the sidewall 125 and the first bracket 140 is altered, thereby restricting the access to the switch 110.

Figure 2:
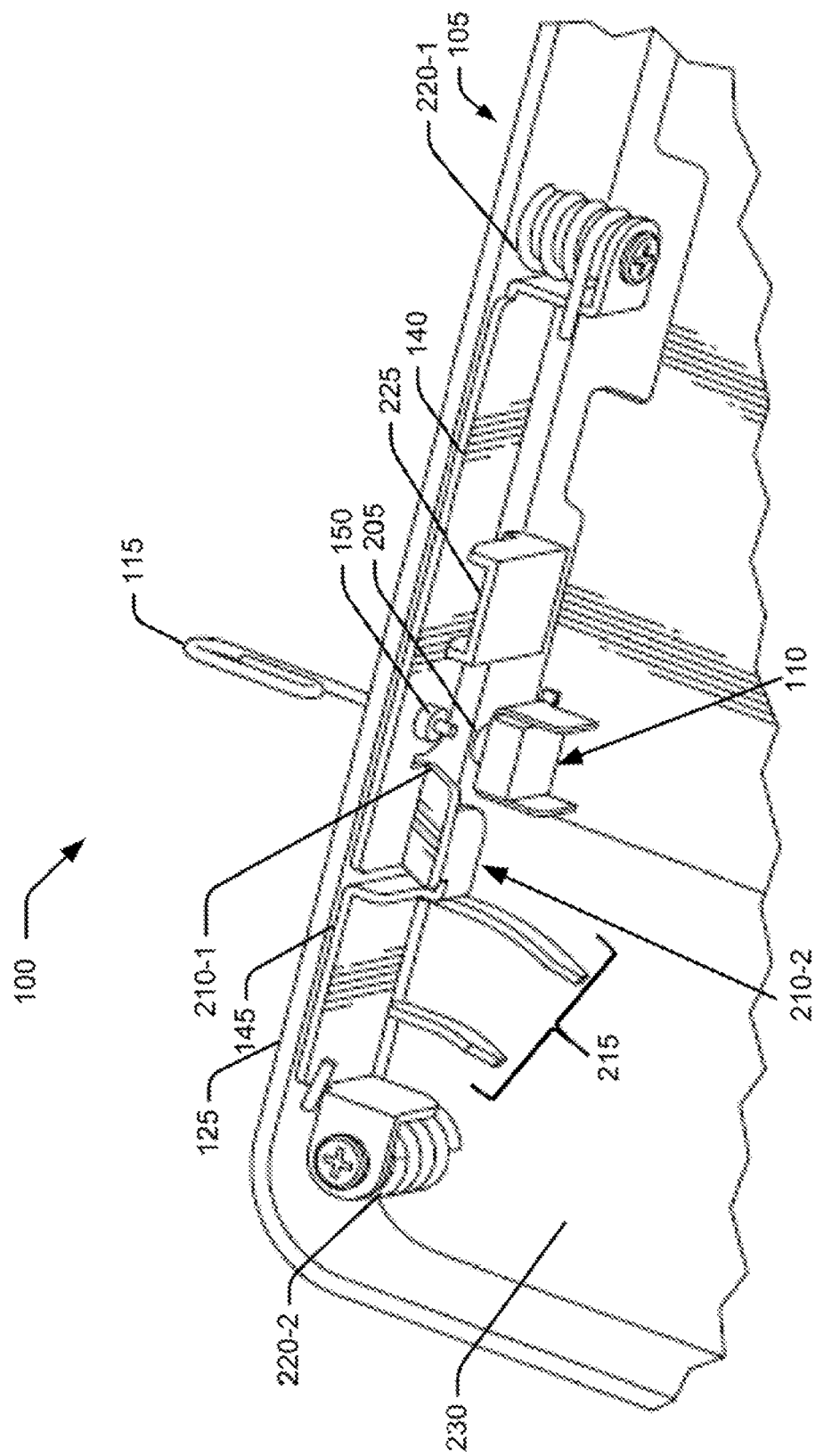
FIG. 2 illustrates the electronic device in an unoccupied condition, according to n example implementation of the present subject matter.
Figure 3:
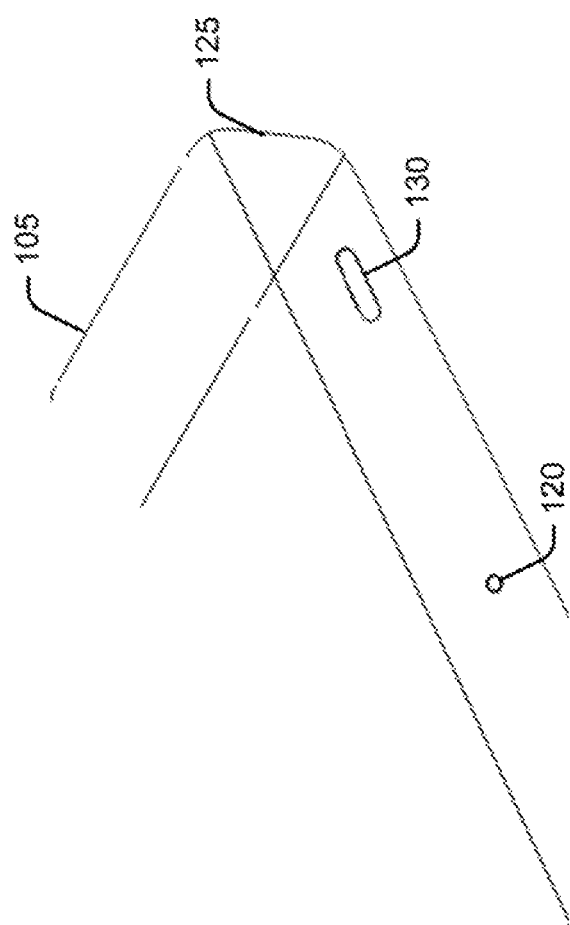
FIG. 3 illustrates a portion of the housing of the electronic device, according to an example implementation of the present subject matter.

FIG. 2 illustrates a schematic of an example electronic device 100 when a slot 130 in a sidewall 15 of a housing 105 of the electronic device 100 is unoccupied, and FIG. 3 illustrates a portion of the electronic device 100, according to example implementation of the present subject matter. The electronic device 100 may be a laptop: however, it will be appreciated that the electronic device 100 can be any other electronic device as well.

In an example, the electronic device 100 includes a switch 110, such as an externally actuated switch, which may be accessed using the external actuator 115, for instance a pin or a finger. The switch 110 may include, for example, an actuation portion 205, which when depressed or accessed, triggers a circuitry corresponding to the switch 110 to generate control instruction for performing a selected or predefined functions. For the sake of brevity, connections of the switch 110 to other components have not been illustrated; however, it will be appreciated that the switch 110 may be coupled to other components, such as a printed circuit board or mother board.

The electronic device 100 may further include the housing 105 to hold components, such as circuits, and mechanical components of the electronic device 100. The housing 105 includes the first bracket 140 and the second bracket 145 coupled to the sidewall 125 of the housing 105. The sidewall 125 includes the opening 120 to receive the external actuator 115 to access and actuate the switch 110, and the slot 130 to receive the external member 135, as shown in FIG. 3. In one example, the first bracket 140 includes the actuator opening 150, which is to align with the opening 120 in the sidewall 125, when the slot 130 is occupied. The second bracket 145 may be disposed between the switch 110 and the sidewall 125 such that the second bracket 145 covers the slot 130 from interior of the housing 105. The first bracket 140 and the second bracket 145, when engaged, may be parallel to the sidewall 125.

Further, one end of the first bracket 140 may be pivotally coupled to the sidewall 125 to move in the same plane in which the sidewall 125 is present. As a result, the first bracket 140 is to move vertically along the width of the sidewall 125. The other end of the first bracket 140 may include a first engaging member 210-1 to engage with the second bracket 145. The first bracket 140 is to move between an upper position (illustrated in FIG. 2) and a lower position (illustrated in FIG. 4). For the sake of explanation, the upper position of the first bracket 140 refers to a position, where the actuator opening 150 is aligned with the opening 120 of the sidewall 125, and the slot 130 is unoccupied. Likewise, the lower position may refer to a position of the first bracket 140 after the disengagement of the second bracket 145 from the first bracket 140, when the two openings 120 and 150 are no longer aligned.

Similar to the first bracket 140, one end of the second bracket 145 may include a second engaging member 210-2, which may provide for co-operation with first engaging member 210-1. The first engaging member 210-1 and the second engaging member 210-2, collectively referred to as engaging members 210, may be provided as protrusions on the corresponding brackets. The second engaging member 210-2 may include an inclined surface having a negative slope, i.e., the second engaging member may slope downwards. On the other hand, the first engaging member 210-1 may have a substantially straight surface or may have a surface having a positive slope, which increases outwards from the first bracket 140. In other examples, the first engaging member 210-1 may have a surface with negative slope, while the second engaging member 210-2 may have a surface with the positive slope.

The other end of the second bracket 145 may be pivotally coupled to the sidewall 125 such that it pivotally moves with respect to the sidewall 125 in a plane which extends perpendicular to the surface of the sidewall 125. The second bracket 145 may be movable over a set of guide rails 210 of the sidewall 125. The guide rails 210 may be angular to facilitate easy movement of the second bracket 146. The second bracket 145 may move over the guide rails 210 between an engaged position (illustrated in FIG. 2) and a disengaged position (illustrated in FIG. 4). The position of the second bracket 145, when the slot 130 is occupied by the external member 135, may be referred to as a disengaged position. Further, the position of the second bracket 145, when the slot 130 is free and the second bracket 145 covers the slot 130 may be referred to as an engaged position. Thus, the upper position of the first bracket 140 corresponds to the engaged position of the second bracket 145, and the lower position of the first bracket 140 corresponds to the disengaged position of the second bracket 145.

The movement of the first bracket 140 and the second bracket 145 between the corresponding two positions may be facilitated by a corresponding biasing mechanism 220. For instance, the first bracket 140 and the second bracket 145 may be pivotally coupled to the sidewall 125 using a first biasing mechanism 220-1 and a second biasing mechanism 220-2, respectively. The first biasing mechanism 220-1 and the second biasing mechanism 220-2, collectively referred to as biasing mechanisms 220, may be, for instance, spring based latches or pivot joints.

Thus, the biasing mechanisms 220 provide for movement of the two brackets 140 and 145 to co-operate with each other. The brackets 140 and 145 may co-operate to engage and disengage, based on whether the slot 130 is occupied or not. When engaged, the second engaging member 210-2 holds the first engaging member 210-1 in its upper position to prevent it from moving to the lower position, thus ensuring that the actuator opening 150 is aligned with the opening 120.

On the other hand, when disengaged, the second engaging member 210-2 may be moved to remove the support provided to the first engaging member 210-1, thereby causing the first bracket 140 to drop to the lower position. In the lower position, the first engaging member 210-1 may be held by a holding unit 225, such as a bracket. The holding unit 225 may rest on a base 230 of the housing 105 and may be disposed between the first biasing mechanism 220-1 and the actuator opening 150. The holding unit 225 prevents the first bracket 140 and the first engaging member 210-1 from touching the base 230 of the housing 105. A gap between the first bracket 140 and the base 230 in the lower position may aid in smooth engagement of the first bracket 140 and the second bracket 145, when the external member 135 may be removed.

Referring back to FIG. 2, in operation, when the slot 130 is free (unoccupied condition), the first bracket 140 engages with the second bracket 145 such that the actuator opening 150 of the first bracket 140 aligns with the opening of the sidewall 125 to receive the external actuator 115. The external actuator 115 may come in contact with the actuation portion 205 to activate the switch 110. It will be appreciated that any alteration in the alignment of the two openings, i.e., the actuator opening 150 and the opening 120 would make the switch 110 inaccessible. According to an aspect of the present subject matter, such alteration is effected by way of the external member 135, which is, received in the slot 130.

Figure 4:
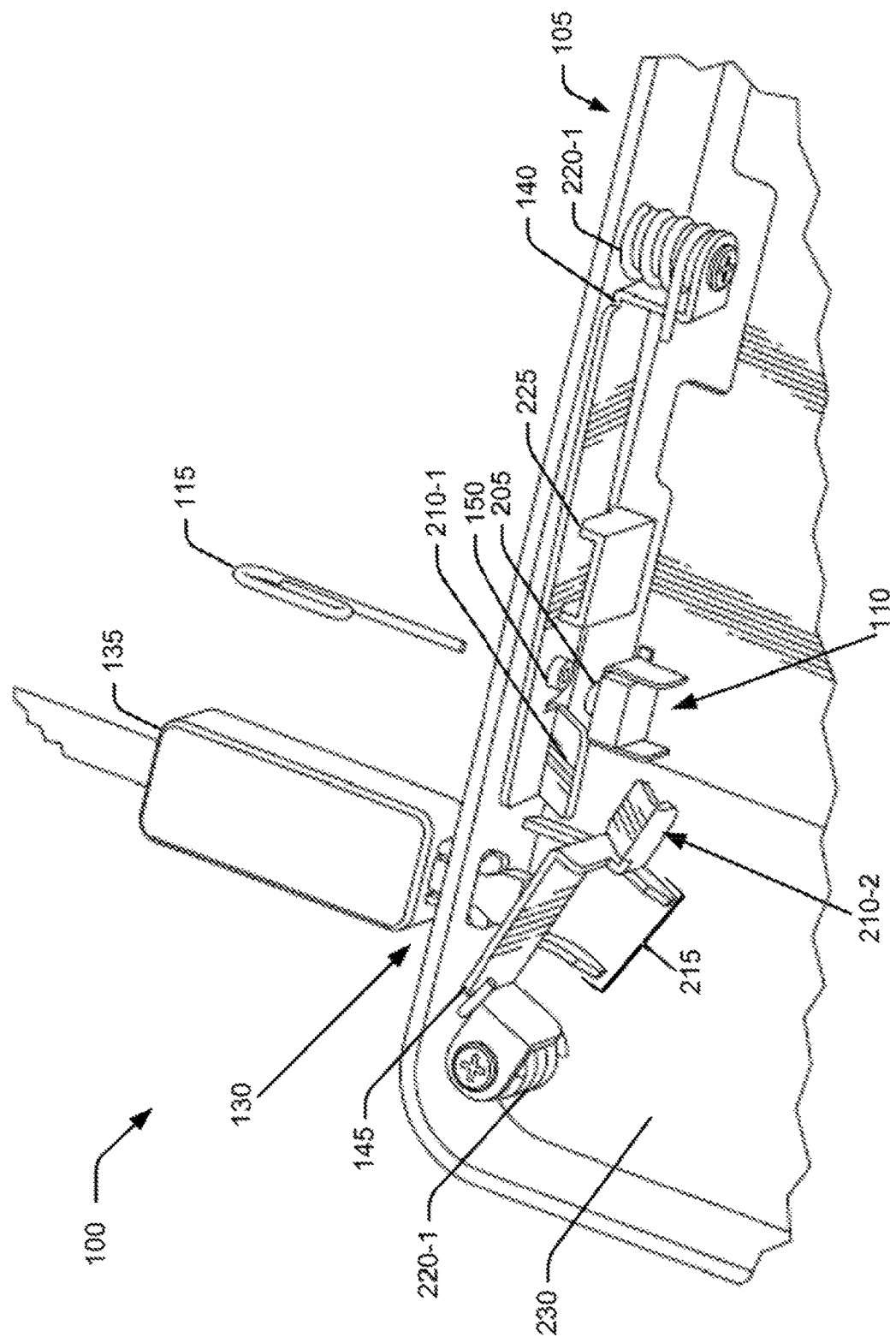
FIG. 4 illustrates the electronic device in an occupied condition, according to an example implementation of the present subject matter.

Now referring to FIG. 4, the electronic device 100 or the housing 105 in an occupied position are illustrated, according to an example implementation of the present subject matter. As described earlier, in the unoccupied condition, the slot 130 may be free, while in the occupied condition, the slot 130 may be occupied by the external member 135. The external member 135 may be, for instance, a portion of an anti-theft device to couple to the electronic device 100 through the slot 130. In other examples, the external member 135 may be a mechanical component, such as a mechanical stick, similar to a USB stick, having a plug portion adapted to be placed in the slot 130.

In an example, the external member 135, when inserted in the slot 130, pushes the second bracket 145 away from the sidewall 125, thereby disengaging the second bracket 145 from the first bracket 140. The external member 135, when received, may cause the second bracket 145 to move in the plane perpendicular to the sidewall 125, thereby causing the second bracket 145 to move on the guide rails 215 from the engaged position to the disengaged position. The movement of the second bracket 145 to the disengaged position, further causes the first bracket 140 to move in the plane parallel to the sidewall 125 to its lower position, where the first engaging member 210-1 is held by the holding unit 225. The movement of the first bracket 140 to the lower position alters the alignment of the actuator opening 150 with the opening 120 of the sidewall 125. Owing to the misalignment of the opening 120 and the actuator opening 150, a solid portion of the first bracket 140 may now cover the opening 120 thereby blocking a path from the opening 120 to the switch 110. Consequently, the switch 110 may be rendered inaccessible in the occupied condition, thereby preventing any possibility of actuation when the external member 135 is inserted.

Accordingly, so long the slot 130 is occupied, the second bracket 145 may be held in the disengage position and the first bracket 140 may be held in the lower position to block the opening 120 provided in the sidewall 125.

Further, to make the switch 110 operable again, the external member 135 may be removed freeing the slot 130 of the sidewall 125. In an example, when the external member 135 is removed, the recoil action of the second biasing mechanism 220-2 may push the second bracket 145 towards the sidewall as the holding the second bracket 145 is no longer present. While the second bracket 145 is being pushed towards to the sidewall 125, the second engaging member 210-2 lifts the first engaging member 210-1 and thus, the first bracket 140 to the upper position. Thus, the first bracket 140 is lifted in an upward direction with respect to the base 230 of the housing 105, to align the actuator opening 150 and the opening 120. In an example, the negative slope of the second engaging member 210-2 may aid in lifting the first engaging member 210-1.

The inward motion of the second bracket 145 engages the second engaging member 210-2 with the first engaging member 210-1. Upon engaging, the second bracket 145, i.e., the second engaging member 210-2 holds the first bracket 140 in its upper position. This provides for alignment of the actuator opening 150 with the opening 120 in the sidewall 125, thereby making the switch 110 accessible again.

Further, it will be appreciated that, the electronic device 100 may include multiple switches operable by external actuators, and one or more of such switches may be rendered inaccessible through the mechanism discussed above.

Thus, the present subject matter provides a mechanism, where an externally operable switch is made accessible in the unoccupied condition of the electronic device or the housing, while the amass is restricted in the occupied condition of the electronic device. In an example, in the occupied condition, the electronic device may be locked using the anti-theft device, such as the Kensington lock. Thus, the present subject matter may work in coordination with already available anti-theft devices, thereby making it cost effective and easy to implement.

Further, in cases, where a user uses the anti-theft device, the switch may automatically be blocked without user having to perform a separate action for restricting the access to the electronic device. Also, while the anti-theft device may prevent stealing, the restricted access to externally operable switches may provide data security. Moreover, an external member other than the anti-theft device may also be used in the occupied condition to prevent accidental activation of the switch.

Although examples for providing access to a switch of an electronic device have been described in language specific to structural features and/or methods, it is to be understood that the appended claims are not limited to the specific features or methods described. Rather, the specific features and methods are disclosed as examples for providing the access to the switch.

I claim:

1. A housing for an electronic device comprising:
   a sidewall having an opening to receive an external actuator to access a switch of the electronic device;
   a first bracket movably coupled to the sidewall, the first bracket having an actuator opening, which when aligned with the opening in the sidewall, allows the external actuator to access the switch; and
   a second bracket movably coupled to the sidewall, wherein the second bracket is movable to co-operate with the first bracket to align the actuator opening with the opening for providing access to the switch;
   wherein the sidewall further comprises a slot to receive an external member of the electronic device, wherein the external member is to move the second bracket away from the sidewall and disengage the second bracket from the first bracket on being received in the slot.

2. The housing as claimed in claim 1, wherein the first bracket comprises a first engaging member and the second bracket comprises a second engaging member to engage the first bracket with the second bracket.

3. The housing as claimed in claim 2, wherein the second engaging member includes an inclined surface, and wherein the second engaging member is to push the first bracket upward with respect to a base of the housing causing the actuator opening to align with the opening in the sidewall, when the external member is received in the slot.

4. The housing as claimed in claim 1, wherein the housing includes a first biasing mechanism to movably couple the first bracket to the sidewall of the housing, and a second biasing mechanism to movably couple the second bracket to the sidewall of the housing.

5. The housing as claimed in claim 1, wherein the housing comprises springs to pivotally couple each of the first bracket and the second bracket to the sidewall.

6. A housing for an electronic device comprising:
   a sidewall having a slot to receive an anti-theft device and an opening to receive an external actuator to operate a switch of the electronic device;
   a first bracket pivotally coupled to the sidewall, the first bracket having an actuator opening, which when aligned with the opening in the sidewall, allows the external actuator to access the switch; and
   a second bracket pivotally coupled to the sidewall, wherein,
   when the slot is unoccupied, the second bracket is to engage with the first bracket to align the actuator opening with the opening in the sidewall; and
   when the slot is occupied by the anti-theft device, the second bracket is to disengage with the first bracket to alter the alignment of the actuator opening with respect to the opening in the sidewall.

7. The housing as claimed in claim 6, wherein the first bracket comprises a first engaging member and the second bracket comprises a second engaging member, and wherein the first engaging member rests on the second engaging member to engage the first bracket with the second bracket.

8. The housing as claimed in claim 7, wherein the second engaging member includes an inclined surface to push the first bracket in an upward direction, with respect to a base of the housing, causing the actuator opening to align with the second opening, when the second engaging member engages with the first engaging member.

9. The housing as claimed in claim 6 further comprising:
   a holding unit to hold the first bracket when the slot is occupied by the anti-theft device in the occupied condition; and
   a set of guide rails located on the sidewall to hold the second bracket.

10. An electronic device comprising:
    a reset switch to reset the electronic device; and
    a housing comprising,
    a sidewall having an opening to receive an external actuator to operate the reset switch;
    a first bracket pivotally coupled to the sidewall and disposed between the sidewall and the switch, the first bracket having an actuator opening; and
    a second bracket pivotally coupled to the sidewall, wherein the second bracket cooperates with the first bracket to align the actuator opening with the opening of the sidewall and the reset switch to provide access to the reset switch.

11. The electronic device as claimed in claim 10, wherein the sidewall comprises a slot to receive an external member of the electronic device.

12. The electronic device as claimed in claim 11 further comprising:
    a holding unit to hold the first bracket, when the first bracket and the second bracket are disengaged; and
    a set of guide rails located on the sidewall to hold the second bracket.

13. The electronic device as claimed in claim 10, wherein the first bracket comprises a first engaging member and the second bracket comprises a second engaging member, and wherein the second engaging member is to hold the first engaging member to engage the first bracket and the second bracket.

14. The electronic device as claimed in claim 10, wherein the housing further comprises:
    a first biasing mechanism to movably couple the first bracket to the sidewall of the housing; and
    a second biasing mechanism to movably couple the second bracket to the sidewall of the housing.

* * * * *